United States Patent
Koh et al.

(10) Patent No.: US 8,435,656 B2
(45) Date of Patent: May 7, 2013

(54) SECONDARY BATTERY WITH PROTECTION CIRCUIT MODULE

(75) Inventors: Seok Koh, Suwon-si (KR); Seokryun Park, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 580 days.

(21) Appl. No.: 12/656,299

(22) Filed: Jan. 25, 2010

(65) Prior Publication Data

US 2010/0209743 A1 Aug. 19, 2010

(30) Foreign Application Priority Data

Feb. 17, 2009 (KR) .................. 10-2009-0012807

(51) Int. Cl.
*H01M 2/22* (2006.01)

(52) U.S. Cl.
USPC .............. 429/7; 320/116; 320/126; 429/161; 429/165; 429/452; 429/453; 429/507; 429/508

(58) Field of Classification Search .................. 429/149, 429/151, 153, 161–163, 166, 167, 186, 452, 429/453, 507–509, 7; 320/116, 126
See application file for complete search history.

(56) References Cited

U.S. PATENT DOCUMENTS

| | | | |
|---|---|---|---|
| 4,663,247 A | 5/1987 | Smilanich et al. | |
| 6,773,848 B1 * | 8/2004 | Nortoft et al. | 429/158 |
| 6,994,926 B2 * | 2/2006 | Ikeuchi et al. | 429/7 |
| 2004/0095093 A1 | 5/2004 | Baba et al. | |
| 2005/0089753 A1 | 4/2005 | Yoon | |
| 2005/0122667 A1 * | 6/2005 | Moon | 361/600 |
| 2005/0202315 A1 | 9/2005 | Sugeno et al. | |
| 2007/0202396 A1 * | 8/2007 | Jung | 429/174 |
| 2007/0231682 A1 | 10/2007 | Aoyama et al. | |
| 2008/0113262 A1 * | 5/2008 | Phillips et al. | 429/149 |
| 2008/0187823 A1 | 8/2008 | Byun et al. | |
| 2008/0220324 A1 * | 9/2008 | Phillips et al. | 429/120 |
| 2010/0009251 A1 | 1/2010 | Shin et al. | |

FOREIGN PATENT DOCUMENTS

| | | |
|---|---|---|
| CN | 1485946 A | 3/2004 |
| CN | 101242092 A | 8/2008 |
| EP | 1 411 579 A | 4/2004 |
| EP | 2 020 695 A | 2/2009 |
| JP | 62-108449 A | 5/1987 |
| JP | 2000-090961 A | 3/2000 |
| JP | 2004-079416 A | 3/2004 |
| JP | 2004-119043 A | 4/2004 |
| JP | 2006-040623 A | 2/2006 |
| KR | 10 2005-0075284 A | 7/2005 |
| KR | 10 2008-0036258 A | 4/2008 |

OTHER PUBLICATIONS

Chinese Office Action in CN 201010116360.X, dated Mar. 1, 2012 (Koh, et al.).

(Continued)

*Primary Examiner* — Joseph Drodge
(74) *Attorney, Agent, or Firm* — Lee & Morse, P.C.

(57) ABSTRACT

A secondary battery including a first bare cell, a second bare cell disposed to face at least a portion of the first bare cell, and a protection circuit module including a circuit board having an electrical circuit device mounted thereon and at least one connection tab between the first and second bare cells, the connection tab electrically connecting the circuit board to the first and second bare cells.

18 Claims, 5 Drawing Sheets

OTHER PUBLICATIONS

Japanese Office Action in JP 2010-007086, dated Jul. 3, 2012 (Koh, et al.).

Korean Examination Report in KR 10 2009-0012807, dated Sep. 20, 2010 (Koh, et al.).

Japanese Notice of Allowance in JP 2010-007086, dated Oct. 30, 2012 (Koh, et al.).

* cited by examiner

SECONDARY BATTERY WITH PROTECTION CIRCUIT MODULE

BACKGROUND OF THE INVENTION

1. Field of the Invention

Embodiments relate to a secondary battery with a protection circuit module.

2. Description of the Related Art

With rapid development of the electronic, communication and computer industries, there is an increasing use of portable electronic devices. Many portable electronic devices employ secondary (rechargeable) batteries as power sources.

Pack-type secondary batteries have been widely used. A typical pack-type secondary battery has a structure in which one or more bare cells serving as an electrical energy source and a protection circuit module (PCM) controlling the charging/discharging of the bare cell are combined into one unit.

SUMMARY OF THE INVENTION

Embodiments are therefore directed to secondary battery with a protection circuit module, which substantially overcome one or more of the problems due to the limitations and disadvantages of the related art.

It is therefore a feature of an embodiment to provide a secondary battery with a protection circuit module that maintains an electrical connection between the protection circuit module and each bare cell of the secondary battery in a simple, stable and reliable manner.

At least one of the above and other features and advantages may be realized by providing a secondary battery, including a first bare cell, a second bare cell disposed to face at least a portion of the first bare cell, and a protection circuit module including a circuit board having an electrical circuit device mounted thereon and at least one connection tab between the first and second bare cells, the connection tab electrically connecting the circuit board to the first and second bare cells.

The connection tab may include an insertion leg between the first and second bare cells.

The insertion leg of the connection tab may include a bending portion contacting both the first and second bare cells.

The bending portion may be between the first and second bare cells and may be elastically deformed.

The connection tab may include a support leg maintaining a gap between the circuit board and the first and second bare cells.

The connection tab may include nickel.

The connection tab may include a material coated with gold or copper.

The connection tab may include a clad material.

The clad material may be a composite of an elastic material and an electrically conductive material.

The elastic material may include nickel and the electrically conductive material may include copper.

The protection circuit module may include two connection tabs, each of which electrically connects the circuit board to the first and second bare cells.

The secondary battery may further include a coupling member disposed between the first and second bare cells, wherein the coupling member is coupled to the first and second bare cells and defines a space between the first bare cell and the second bare cell for receiving the connection tab.

The coupling member may include foam tape.

The secondary battery may further include an auxiliary tab electrically connecting the first bare cell and the second bare cell.

The auxiliary tab may be welded to the first and second bare cells.

Each of the first and second bare cells may include a can, each can may include a bottom plate and a sidewall structure extending upward from the bottom plate, and a portion of the sidewall structure of the first bare cell may be disposed to face a portion of the sidewall structure of the second bare cell.

The sidewall structure of the can of each of the first and second bare cells may include two opposing wide sidewalls, and the connection tab may be between one of the wide sidewalls of the can of the first bare cell and one of the wide sidewalls of the can of the second bare cell.

The secondary battery may further include an upper case covering the circuit board of the protection circuit module, wherein the circuit board of the protection circuit module is coupled to the upper case.

One of the circuit board and the upper case may include a protruding portion and the other of the circuit board and the upper case may include an insertion groove for receiving the protruding portion.

The secondary battery may further include a label surrounding the first and second bare cells.

The first bare cell and the second bare cell may be electrically connected in parallel with respect to each other.

The secondary battery may further include an upper case covering the protection circuit module and a lower case disposed opposite to the upper case, wherein the upper case includes two reinforcement legs extending toward the lower case, and the lower case includes two reinforcement columns extending toward the upper case and coupled to the reinforcement legs of the upper case.

Each of the reinforcement legs of the upper case and the reinforcement columns of the lower case may include a protruding portion extending between the first and second bare cells.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION OF THE INVENTION

Korean Patent Application No. 10-2009-0012807, filed on Feb. 17, 2009, in the Korean Intellectual Property Office, and entitled "Secondary Battery with Protection Circuit Module", is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 1:
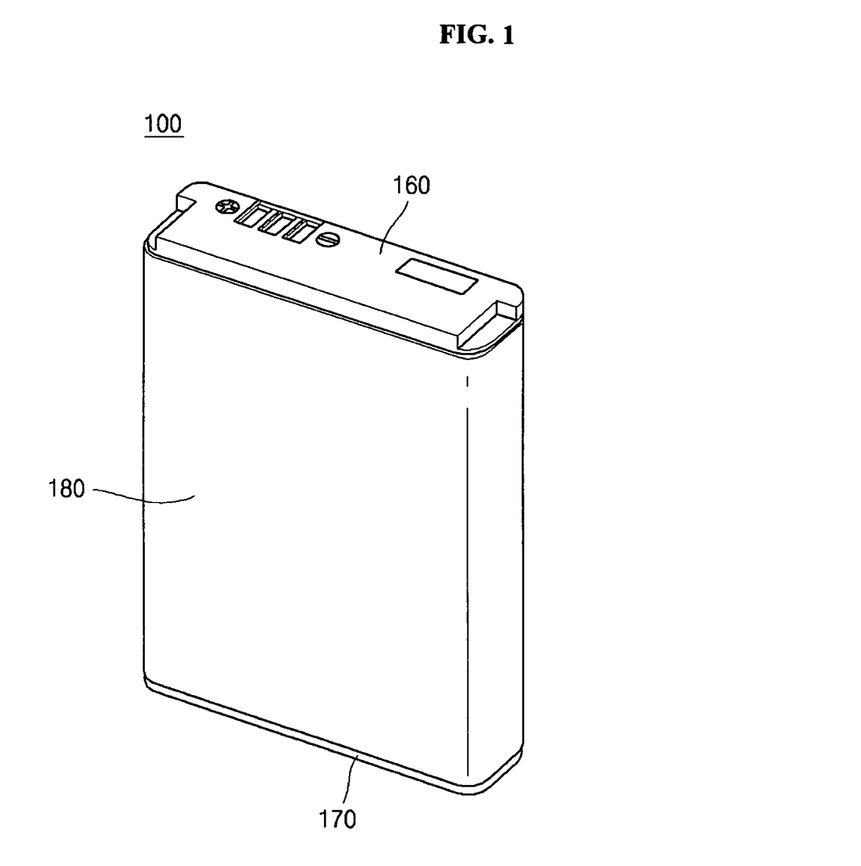
FIG. 1 illustrates a perspective view of a secondary battery according to an embodiment.
Figure 2:
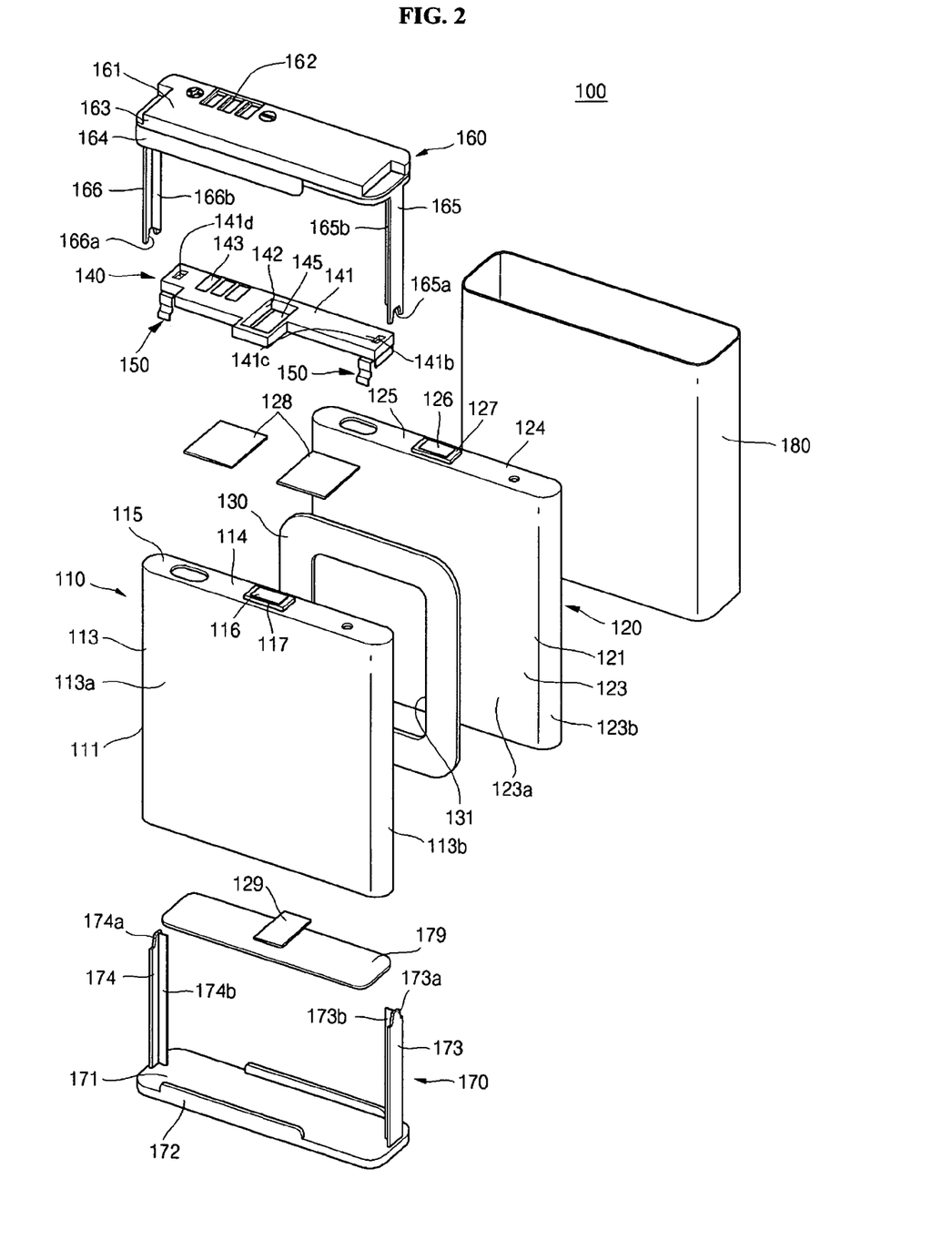
FIG. 2 illustrates an exploded perspective view of the secondary battery of FIG. 1.
Figure 3:
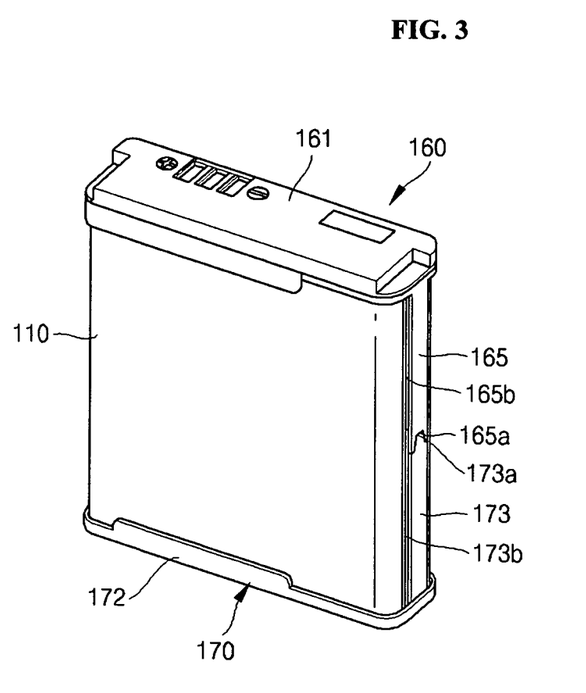
FIG. 3 illustrates a perspective view of the secondary battery of FIG. 1 where a label is omitted.
Figure 4:
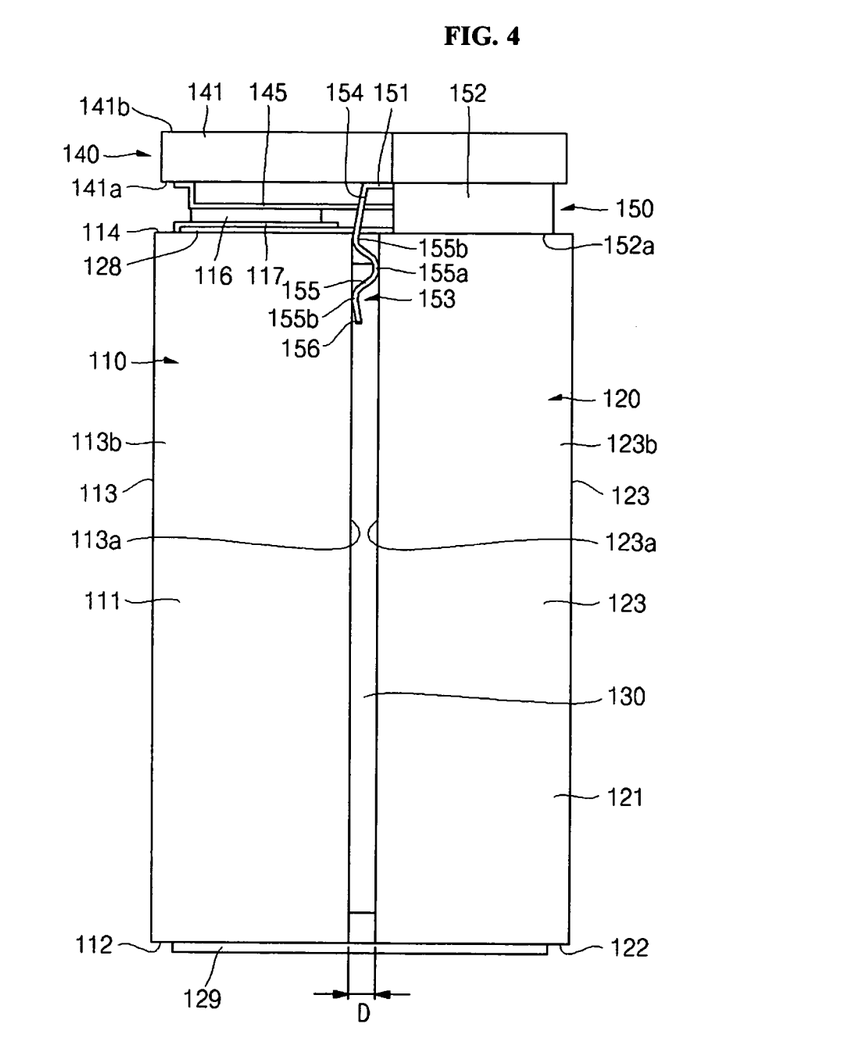
FIG. 4 illustrates a side view of the secondary battery of FIG. 3 where an upper case and a lower case are omitted.

The embodiments will now be described more fully with reference to the accompanying drawings, in which exemplary embodiments are shown. FIG. 1 illustrates a perspective view of a secondary battery according to an embodiment. FIG. 2 illustrates an exploded perspective view of the secondary battery of FIG. 1. FIG. 3 illustrates a perspective view of the secondary battery of FIG. 1 where a label is omitted. FIG. 4 illustrates a side view of the secondary battery of FIG. 3 where an upper case and a lower case are omitted.

Referring to FIGS. 1 through 4, a secondary battery 100 according to an embodiment may include a first bare cell 110, a second bare cell 120, a coupling member 130, a protection circuit module (PCM) 140, an upper case 160, a lower case 170 and a label 180. The secondary battery 100 may further include, e.g., insulating tape 128, an auxiliary tab 129 and an adhesive tape 179.

The first bare cell 110, which serves as an electrical energy source, may include an electrode assembly (not shown), a can 111 having an opening (not shown) and receiving the electrode assembly via the opening and a cap assembly 114 sealing the opening of the can 111. Although not shown, the electrode assembly may be formed by winding a positive electrode plate, a negative electrode plate and a separator interposed therebetween. A positive electrode tab and a negative electrode tab may be respectively coupled to the positive electrode plate and the negative electrode plate.

The can 111 may include a metal case having an approximately rectangular parallelepiped shape. The can 111 may include a bottom plate 112 having an approximately rectangular shape and a sidewall structure 113 extending upward from edges of the bottom plate 112. The sidewall structure 113 may include two opposing wide sidewalls 113a having a relatively large width and two opposing narrow sidewalls 113b having a relatively small width. The can 111 may have a space for receiving the electrode assembly and an electrolyte solution, and be electrically connected to the positive electrode tab to serve as a positive terminal. The can 111 may be produced by a forming process, e.g., metal deep drawing, using, e.g., aluminum or an alloy thereof.

The cap assembly 114 may include a cap plate 115 and an electrode terminal 116. The cap plate 115 may have an approximately rectangular shape and may seal the opening (not shown) in the can 111. The cap plate 115 may include an electrically conductive metal material, e.g., aluminum or an alloy thereof. The cap plate 115 may be electrically connected to the positive electrode tab of the electrode assembly to serve as a positive terminal. The electrode terminal 116 may be disposed at an approximately center portion of the cap plate 115 and pass through the cap plate 115. The electrode terminal 116 may be insulated from the cap plate 115 by an insulating gasket 117 surrounding the electrode terminal 116. The electrode terminal 116 may be electrically connected to the negative electrode tab of the electrode assembly to serve as a negative terminal. Although the embodiments have been described in connection with the embodiment where the cap plate 115 serves as a positive terminal and the electrode terminal 116 serves as a negative terminal, the embodiments are not limited thereto. It should be understood that the cap plate 115 may serve as a negative terminal and the electrode terminal 116 may serve as a positive terminal, depending on a connection state of the cap plate 115 and the electrode terminal 116 to the positive and negative electrode tabs of the electrode assembly.

The second bare cell 120 may have substantially the same structure as the first bare cell 110, and thus, a repeated detailed description thereof will be omitted. The first bare cell 110 and the second bare cell 120 may be electrically connected in parallel with respect to each other. One of two opposing wide sidewalls 123a of the second bare cell 120 may be disposed to face one of the two opposing wide sidewalls 113a of the first bare cell 110. The insulating tape 128 may be attached to a portion of the cap plate 115 of the first bare cell 110 and a portion of the cap plate 125 of the second bare cell 120 corresponding to circuit devices (not shown) mounted on the protection circuit module 140. The insulating tape 128 may insulate the circuit devices of the protection circuit module 140 from the first bare cell 110 and the second bare cell 120. The bottom plate 112 of the first bare cell 110 and the bottom plate 122 of the second bare cell 120 may be electrically connected to each other by an auxiliary tab 129 made of an electrically conductive material, e.g., nickel. The auxiliary tab 129 may be coupled to the bottom plate 112 of the first bare cell 110 and the bottom plate 122 of the second bare cell 120 by, e.g., resistance welding. The auxiliary tab 129 may electrically connect the positive electrode of the first bare cell 110 and the positive electrode of the second bare cell 120, and at the same time, improve mechanical coupling between the first bare cell 110 and the second bare cell 120.

The coupling member 130 may be interposed between the first bare cell 110 and the second bare cell 120 to couple the two bare cells 110 and 120. The coupling member 130 may include a foam tape (e.g., a double-sided foam tape), but the embodiments are not limited thereto. The opposing wide sidewalls 113a and 123a of the first and second bare cells 110 and 120 may be spaced apart from each other by the coupling member 130. A through-hole 131 may be disposed at a center portion of the coupling member 130. The through-hole 131 may serve as a space for receiving a swelled portion during swelling of the first and second bare cells 110 and 120.

The protection circuit module 140 may include a circuit board 141, a first connection tab 145 and at least one second connection tab 150. The protection circuit module 140 may control the entire operation (e.g., charging/discharging) of the secondary battery 100.

The circuit board 141 may include, e.g., a printed circuit board with wire patterns. A through-hole 142 may be disposed in a center portion of the circuit board 141 to connect the first connection tab 145 to the electrode terminal 116 of the first bare cell 110 and the electrode terminal 126 of the second bare cell 120. A joining process, e.g., resistance welding, may be performed in the through-hole 142 to connect the first connection tab 145 to the electrode terminal 116 of the first bare cell 110 and the electrode terminal 126 of the second bare cell 120. The circuit board 141 may include a first surface 141a and a second surface 141b opposite to the first surface 141a. The first connection tab 145 may be coupled to a center portion of the first surface 141a, and the second connection tabs 150 may be coupled to ends of the first surface 141a. The first surface 141a may be spaced apart from, and face, the cap plates 115 and 125 of the first and second bare cells 110 and 120. Electrical circuit devices (not shown) may be mounted on the first surface 141a of the circuit board 141. The electrical circuit devices may include, e.g., control integrated circuits (control ICs), charge-discharge switches, temperature fuses (e.g., PTC devices), and others. The electrical circuit devices may be electrically insulated from the first and second bare cells 110 and 120 by the insulating tape 128 attached to the cap plates 115 and 125 of the first and second bare cells 110 and 120. The second surface 141b of the circuit board 141 may have a plurality of external terminals 143 electrically connected to, e.g., an external load or a capacitor. The second surface 141b of the circuit board 141 may also include two insertion grooves 141c and 141d for coupling the circuit board 141 and the upper case 160. The two insertion grooves 141c and 141d may be disposed at ends of the second surface 141b of the circuit board 141.

The first connection tab 145 may be electrically connected to the first surface 141a of the circuit board 141, and at the same time, it may be electrically connected to the electrode terminal 116 of the first bare cell 110 and the electrode terminal 126 of the second bare cell 120 by, e.g., resistance welding or the like. Such welding may be performed in the through-hole 142 of the circuit board 141. The first connection tab 145 may electrically connect the electrode terminal 116 of the first bare cell 110 and the electrode terminal 126 of the second bare cell 120, and at the same time, electrically connect the two electrode terminals 116 and 126 and the circuit board 141.

Figure 5:
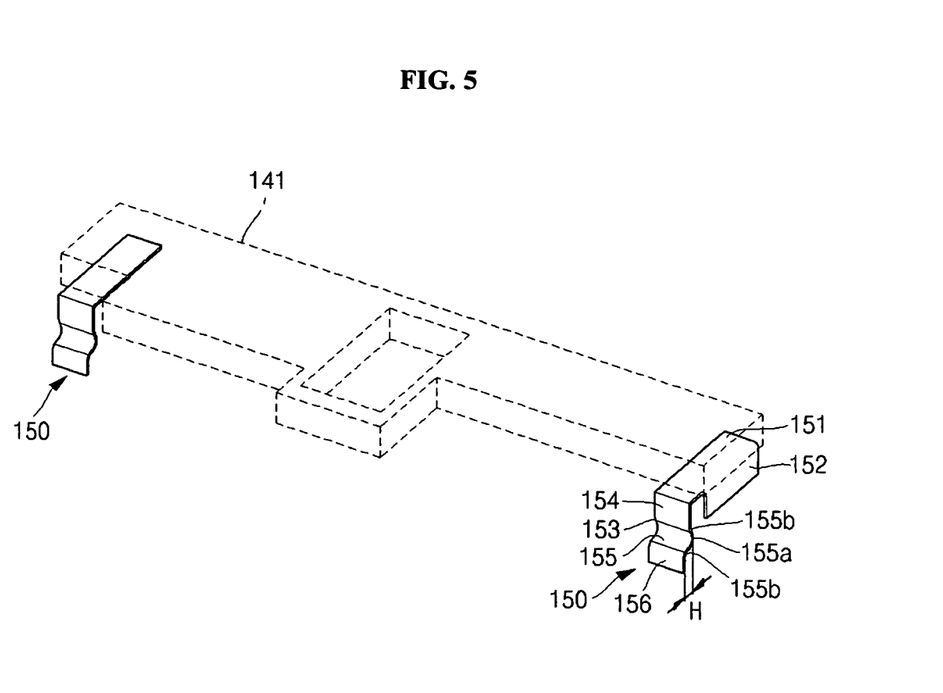
FIG. 5 illustrates a perspective view of two second connection tabs included in the secondary battery of FIG. 2.

FIG. 5 illustrates a detailed view of the two second connection tabs 150. Referring to FIG. 5, together with FIG. 4, the two second connection tabs 150 may be disposed at ends of the circuit board 141. The second connection tabs 150 may each be formed by folding an electrically conductive plate member, and may electrically connect the circuit board 141 to the cans 111 and 121 of the first and second bare cells 110 and 120.

Each of the second connection tabs 150 may include a base plate 151, a support leg 152 and an insertion leg 153 folded and extended from the base plate 151. The base plate 151 may be an approximately rectangular plate. The base plate 151 may be electrically connected to the first surface 141a of the circuit board 141.

The support leg 152 may be folded at an angle of about 90 degrees with respect to the base plate 151 and extend away from the base plate 151. An end 152a of the support leg 152 may contact the cap plate 125 of the second bare cell 120. The support leg 152 may be structured such that the circuit board 141 is spaced from the first and second bare cells 110 and 120 by a predetermined distance.

The insertion leg 153 may be folded at an angle of about 90 degrees with respect to the base plate 151 and extend away from the base plate 151. The insertion leg 153 may include a first extension portion 154 extending from the base plate 151, a bending portion 155 bent in roughly a triangular shape and extending from the first extension portion 154 and a second extension portion 156 extending from the bending portion 155. The bending portion 155 may be inserted into a space defined by the first and second bare cells 110 and 120. A top portion 155a of the bending portion 155 may contact and electrically connect to one of the wide sidewalls 123a of the second bare cell 120. Bottom portions 155b of the bending portion 155 may contact and electrically connect to one of the wide sidewalls 113a of the first bare cell 110. In order to stably maintain a connection state of the bending portion 155 to the wide sidewalls 113a and 123a of the first and second bare cells 110 and 120, a height H of the bending portion 155 may be greater than a gap D between the first and second bare cells 110 and 120. The connection tab 145 as a whole, or a portion thereof, e.g., the bending portion 155, may be formed of an elastic material. When inserted into the space defined by the first and second bare cells 110 and 120, the bending portion 155 may be elastically deformed such that the height H of the bending portion 155 is about the same as or larger than the gap D between the first and second bare cells 110 and 120, thereby enabling a stable connection between the bending portion 155 and the wide sidewalls 113a and 123a of the first and second bare cells 110 and 120. When the insertion leg 153 is inserted between the first and second bare cells 110 and 120, the circuit board 141 may be electrically connected to the cans 111 and 121 of the first and second bare cells 110 and 120, simplifying a battery fabrication process.

The second connection tabs 150 may include, e.g., nickel, but the embodiments are not limited thereto. In order to enhance the electrical conductivity of the second connection tabs 150, the second connection tabs 150 may include, e.g., nickel coated with gold or copper. The second connection tabs 150 may also include a clad material. The second connection tabs 150 may include a composite material of, e.g., an elastic material (e.g., nickel) and an electrically conductive material (e.g., copper). Although an embodiment has been described wherein the two connection tabs 150 are electrically connected to the circuit board 141 of the protection circuit module 140, the embodiments are not limited thereto. It should be understood that one of the two second connection tabs 150 may be electrically connected to the circuit board 141 of the protection circuit module 140 and the other may be, e.g., a dummy tab that is not electrically connected to the circuit board 141 of the protection circuit module 140.

Referring back to FIGS. 1 through 3, the upper case 160 may cover and protect the protection circuit module 140. The upper case 160 may include a cover plate 161, sidewalls 163 extending downward from edges of the cover plate 161 and first and second reinforcement legs 165 and 166 extending downward from edges not including the sidewalls 163.

The cover plate 161 may cover the cap plates 115 and 125 of the first and second bare cells 110 and 120 coupled by the coupling member 130. A through-hole 162 may be formed in the cover plate 161. The external terminals 143 of the protection circuit module 140 may be exposed through the through-hole 162. An inner surface of the cover plate 161 may face the second surface 141b of the circuit board 141 of the protection circuit module 140. Although not shown, the cover plate 161 may further include two protruding portions corresponding to the insertion grooves 141c and 141d formed on the circuit board 141 of the protection circuit module 140. The protruding portions, which may protrude toward the circuit board 141, may be inserted and fixed to the insertion grooves 141c and 141d of the circuit board 141. When the protruding portions of the upper case 160 are inserted and fixed to the insertion grooves 141c and 141d of the circuit board 141, the circuit board 141 may be stably connected to the first and second bare cells 110 and 120. Although an embodiment has been described wherein the protruding portions are formed on the upper case 160 and the insertion grooves 141c and 141d are formed on the circuit board 141, the embodiments are not limited thereto. That is, protruding portions may be formed on the circuit board 141, and insertion grooves may be formed on the upper case 160. Alternatively, a protruding portion and an insertion groove may be formed on the upper case 160, and a corresponding insertion groove and a corresponding protruding portion may be formed on the circuit board 141.

Ends of the sidewalls 163 may contact the cap plates 115 and 125 of the first and second bare cells 110 and 120 to support the upper case 160. The upper case 160 may further include two extension portions 164 extending downward from outer edges that include the sidewalls 163. The extension portions 164 may be structured to overlie upper portions of the wide sidewalls 113$a$ and 123$a$ of the cans 111 and 121 of the first and second bare cells 110 and 120.

The first and second reinforcement legs 165 and 166 may be structured to overlie the narrow sidewalls 113$b$ and 123$b$ of the cans 111 and 121 of the first and second bare cells 110 and 120. Grooves 165$a$ and 166$a$ may be respectively formed at ends of the first and second reinforcement legs 165 and 166. First and second protruding portions 165$b$ and 166$b$ may be respectively formed on inside surfaces of the first and second reinforcement legs 165 and 166, and may be inserted into the space defined by the first and second bare cells 110 and 120. The first and second reinforcement legs 165 and 166 may reinforce coupling between the first and second bare cells 110 and 120.

The lower case 170 may include a bottom plate 171, two extension portions 172 extending upward from two opposing edges of the bottom plate 171 and first and second reinforcement columns 173 and 174 extending upward from the other two opposing edges of the bottom plate 171. The bottom plate 171 may be configured to cover the bottom plates 112 and 122 of the first and second bare cells 110 and 120 coupled by the coupling member 130. The bottom plate 171 may be attached to the bottom plates 112 and 122 of the first and second bare cells 110 and 120 by the adhesive tape 179. The extension portions 172 may be structured to overlie lower portions of the wide sidewalls 113$a$ and 123$a$ of the cans 111 and 121 of the first and second bare cells 110 and 120. The first and second reinforcement columns 173 and 174 may be structured to overlie the narrow sidewalls 113$b$ and 123$b$ of the cans 111 and 121 of the first and second bare cells 110 and 120. Bump portions 173$a$ and 174$a$ may be respectively formed at ends of the first and second reinforcement columns 173 and 174. The bump portion 173$a$ of the first reinforcement column 173 may be inserted and fixed to the groove 165$a$ of the first reinforcement leg 165 of the upper case 160. The bump portion 174$a$ of the second reinforcement column 174 may be inserted and fixed to the groove 166$a$ of the second reinforcement leg 166 of the upper case 160. First and second protruding portions 173$b$ and 174$b$ may be respectively formed on inside surfaces of the first and second reinforcement columns 173 and 174 and inserted into the space defined by the first and second bare cells 110 and 120. The first and second reinforcement columns 173 and 174 may reinforce coupling between the first and second bare cells 110 and 120, together with the first and second reinforcement legs 165 and 166 of the upper case 160.

The label 180 may be attached to the first and second bare cells 110 and 120 to surround the sidewall structures 113 and 123 of the bare cells 110 and 120. The extension portions 164 and the first and second reinforcement legs 165 and 166 of the upper case 160 and the extension portions 172 and the first and second reinforcement columns 173 and 174 of the lower case 170 may also be covered with the label 180.

According to an embodiment, a secondary battery may be structured with a plurality of bare cells that are electrically connected to a single protection circuit module in order to increase the capacity of the battery. In such a secondary battery, it is important to stably and reliably maintain an electrical connection between the protection circuit module and each bare cell. According to an embodiment, a protection circuit module may include a connection tab, which is inserted into a space between two bare cells, the connection tab electrically connecting the protection circuit module to the two bare cells, thereby ensuring a stable and reliable connection between the protection circuit module and the bare cells. Furthermore, the use of such a connection tab may not require a joining process, e.g., welding, for the connection between the protection circuit module and bare cells, thereby simplifying the secondary battery fabrication process.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery, comprising:
a first bare cell including an electrically conductive can;
a second bare cell including an electrically conductive can, the second bare cell being disposed to face at least a portion of the first bare cell; and
a protection circuit module including a circuit board having an electrical circuit device mounted thereon and at least one connection tab between the first and second bare cells, the connection tab electrically connecting the circuit board to the first and second bare cells, wherein:
the connection tab includes an insertion leg between the first and second bare cells, the connection tab contacting and electrically connecting the circuit board, the can of the first bare cell, and the can of the second bare cell, and
the insertion leg of the connection tab includes a bending portion, the bending portion being between the first and second bare cells and being elastically deformed.

2. The secondary battery as claimed in claim 1, wherein the connection tab includes a support leg maintaining a gap between the circuit board and the first and second bare cells.

3. The secondary battery as claimed in claim 1, wherein the connection tab includes nickel.

4. The secondary battery as claimed in claim 1, wherein the connection tab includes a material coated with gold or copper.

5. The secondary battery as claimed in claim 1, wherein the connection tab includes a clad material that is a composite of an elastic material and an electrically conductive material.

6. The secondary battery as claimed in claim 5, wherein the elastic material includes nickel and the electrically conductive material includes copper.

7. The secondary battery as claimed in claim 1, wherein the protection circuit module includes two connection tabs, each of which electrically connects the circuit board to the first and second bare cells.

8. The secondary battery as claimed in claim 1, further comprising a coupling member disposed between the first and second bare cells, wherein the coupling member is coupled to the first and second bare cells and defines a space between the first bare cell and the second bare cell for receiving the connection tab.

9. The secondary battery as claimed in claim 1, further comprising an auxiliary tab electrically connecting the first bare cell and the second bare cell.

10. The secondary battery as claimed in claim 9, wherein the auxiliary tab is welded to the first and second bare cells.

11. The secondary battery as claimed in claim 1, wherein:
each can includes a bottom plate and a sidewall structure extending upward from the bottom plate, and
a portion of the sidewall structure of the first bare cell is disposed to face a portion of the sidewall structure of the second bare cell.

12. The secondary battery as claimed in claim 11, wherein the sidewall structure of the can of each of the first and second bare cells includes two opposing wide sidewalls, and the connection tab is between one of the wide sidewalls of the can of the first bare cell and one of the wide sidewalls of the can of the second bare cell.

13. The secondary battery as claimed in claim 1, further comprising an upper case covering the circuit board of the protection circuit module, wherein the circuit board of the protection circuit module is coupled to the upper case.

14. The secondary battery as claimed in claim 13, wherein one of the circuit board and the upper case includes a protruding portion and the other of the circuit board and the upper case includes an insertion groove for receiving the protruding portion.

15. The secondary battery as claimed in claim 1, wherein the first bare cell and the second bare cell are electrically connected in parallel with respect to each other.

16. The secondary battery as claimed in claim 1, further comprising an upper case covering the protection circuit module and a lower case disposed opposite to the upper case, wherein the upper case includes two reinforcement legs extending toward the lower case, and the lower case includes two reinforcement columns extending toward the upper case and coupled to the reinforcement legs of the upper case.

17. The secondary battery as claimed in claim 16, wherein each of the reinforcement legs of the upper case and the reinforcement columns of the lower case includes a protruding portion extending between the first and second bare cells.

18. The secondary battery as claimed in claim 1, wherein:
the elastically deformed bending portion is in an elastically deformed condition in an assembled state of the secondary battery and in a non-elastically deformed condition in an unassembled state of the secondary battery,
in the non-elastically deformed condition, the bending portion has a height greater than a width of a gap between the first and second bare cells, and
in the elastically deformed condition, the bending portion has a height equal to the width of the gap between the first and second bare cells.

* * * * *